Aug. 21, 1945. F. H. WHEATON, JR 2,383,098
DOUBLE-MOUTHED BOTTLE
Filed July 21, 1942
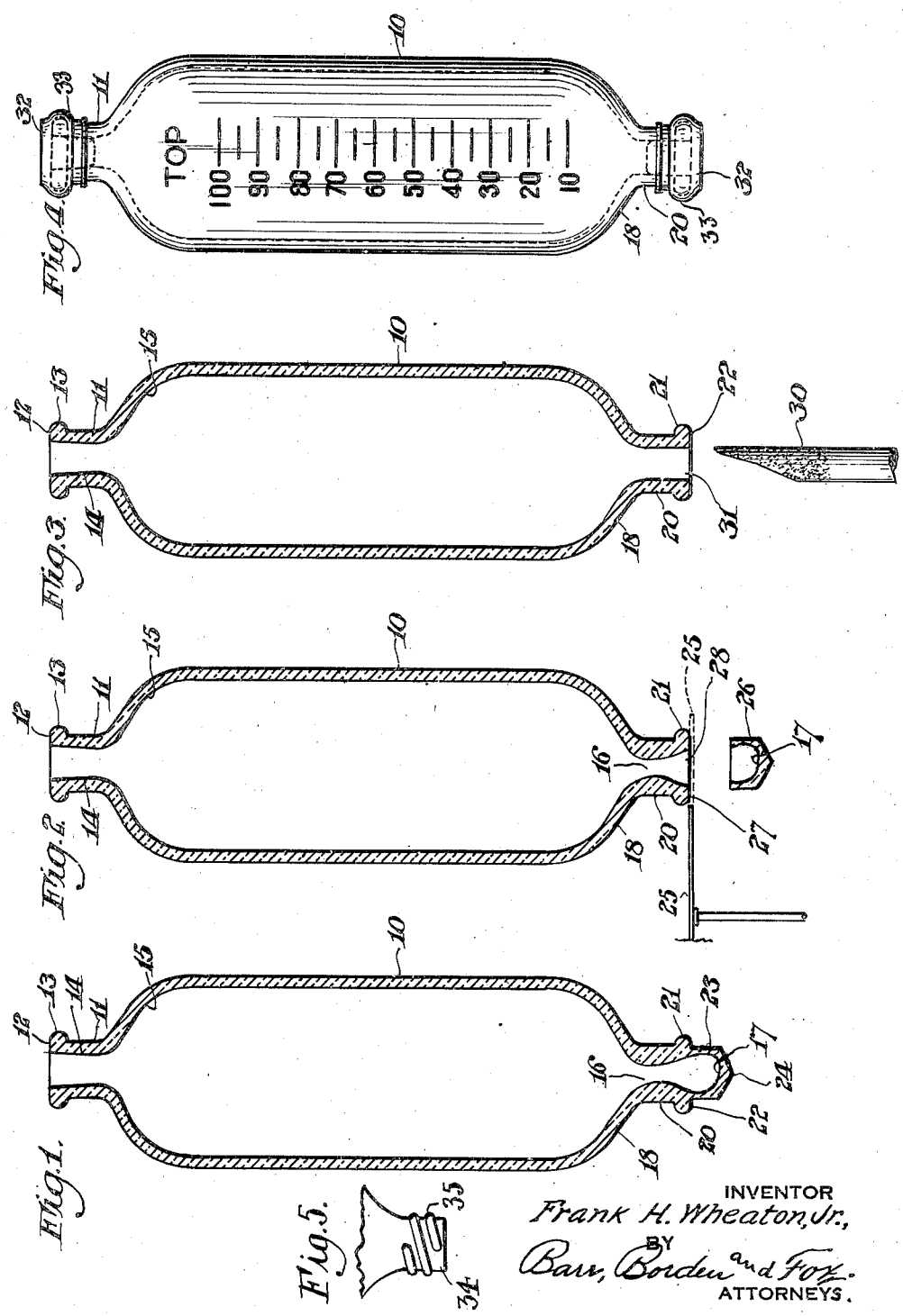
INVENTOR
Frank H. Wheaton, Jr.,
BY
Barr, Borden and Fox
ATTORNEYS.

Patented Aug. 21, 1945

2,383,098

UNITED STATES PATENT OFFICE 2,383,098

DOUBLE-MOUTHED BOTTLE

Frank H. Wheaton, Jr., Millville, N. J.

Application July 21, 1942, Serial No. 451,798

2 Claims. (Cl. 49—79)

This invention relates to double mouthed bottles, and to the process for forming same.

An excellent example of the use of these bottles is as blood plasma containers arranged so as to facilitate emergency but proper use of the contents thereof. It has been the universal practic heretofore, so far as known, to form such bottles of pieces of blown tubing. This has had certain disadvantages. The tubing is expensive and usually must be purchased and shipped from an organization different and more or less geographically remote from that which is engaged in blowing the tubing, the labor involved is appreciable in contrast to the automatic production of bottles, the production rate is slow, not infrequently small particles of broken glass adhere to the surface of the bore of the tubing and lodge in the finished bottle, definite limitations are placed upon the proportions of the bottle, as length must be resorted to for capacity in view of the limited diameter available from tubing, and the containers may be so attenuated as to have such thin walls as to be very fragile.

It is among the objects of this invention; to improve the art of bottles; to improve the methods of forming bottles; to provide a double mouthed bottle as the end result of an automatic molding machine and process; to provide an improved design of bottle; to form a bottle of appreciable thickness and strength of walls having a neck and mouth on each end; to overcome the disadvantage attaching to the use of tubing for the formation of such containers; and many other objects and advantages will become more apparent as the description proceeds.

In carrying out the invention in a preferred embodiment, I provide a molded bottle having one conventional lipped or screw-neck openmouth end, and the outer profile of a secondary lipped or screw-neck mouth end but which is sealed across by a protruding tip in the manufacture and which then has the tip removed to expose a probably irregular or asymmetrical constricted aperture communicating with the inner surface of the bottle, pursuant to which the constricted asymmetrical aperture is reamed to a true mouth size and concentric location within the secondary neck.

In the accompanying drawing forming part of this description;

Fig. 1 represents a longitudinal section through a preferred form of the improved bottle as formed by preferably automatic molding machinery;

Fig. 2 represents a similar view with the previously integral aperture-forming tip shown in spaced juxtaposed relation to the end of the bottle neck after its separation therefrom by the rotary saw or the like shown in fragmentary elevation adjacent to the neck;

Fig. 3 represents a similar view with the constricted aperture reamed out, with the drill shown in fragmentary elevation adjacent to the end of the bottle, Fig. 4 represents an elevation of the finished bottle showing the manner in which the skirts of inserted resilient corks bend back and conceal the ends of the necks, and Fig. 5 represents a fragmentary elevation of a modified form of bottle neck.

In molding bottles by automatic machinery, in one type of molding unit, a cylindrical gob of molten glass is dropped into a preliminary molding unit in which a depression is made in the end of the cylindrical gob of glass, and the latter is then inverted and dropped into the ultimate mold in which it is expanded and forced laterally into every part of its molding surface by a stream of compressed air introduced into the preliminarily formed depression in the end. In such molding, although the outer contours are rather exactly followed, the inner surface contours are formed by the entrapped air. It is necessary that the mold be arranged to receive and shape a continuous layer of glass on every surface except where the air-introducing mouth is located. In other words, in such automatic molding devices it is not possible, so far as known, to form two open mouths at opposite ends of the mold simultaneously in the same molded unit.

It is not deemed necessary to show any of the parts of the molding devices, as they will be obvious from what follows, and as they form no inventive part of the invention herein.

Referring now to Fig. 1, there is disclosed a section of a single-orificed bottle, forming the foundation element of the complete bottle of this invention, comprising a main cylindrical bottle portion 10 merging at the upper end into the reduced neck 11, the end face 12, the peripheral bead or lip 13, and the mouth orifice or aperture 14, leading from the end 12 to the internal surface 15 of the bottle. As molded, the internal surface 15 converges inwardly to a zone of constriction 16, which at the very bottom enlarges again in the rounded bottom surface 17. The internal surface 15, 16 and 17 defines a space which is completely enclosed in glass except at mouth 14. Externally, the lower end of the bottle is formed with the convergent walls 18 lading to the secondary neck 20, terminating externally in the secondary peripheral bead or rib 21, from the annular planar lower face 22 of which the generally cylindrical tip 23 extends substantially normally, to terminate in the rounded point 24. It will be observed that the inner surface 15, 16 and 17 does not necessarily observe any close approximation to uniform spacing from the external surfaces that have been described, and it is only of importance to note that the enclosed space defined by inner surface 15, 16 and 17 has an extension past the plane end 22 of the secondary bead 21, into the tip portion.

It will be clear that the device shown in Fig. 1 can readily be molded and finished in the mold as a complete single orifice, and an incomplete double-orifice bottle.

The bottle of Fig. 1 representing completion of the molding, is then brought laterally against a cutting tool or saw 25 such as a thin carborundum wheel or the like, moving with the planar partial face 22 of the secondary bead or rib 21 as a guide, to cut through the cylinder 23 of the closed tip, to cut the tip off and away as a piece of scrap glass 26 as shown in Fig. 2, to form a planar transverse extension of the face 22 on the bead 21 as a plane end 27 on the bottle. Plane end 27 is preferably substantially parallel to terminal plane 12 and is pierced by the generally constricted orifice or mouth 28, formed by the inner surface 16 and 17 of the once closed bottle. Although the orifice 28 may be perfectly correct in its size, disposition and symmetry relative to the neck of the bottle and especially as regards its symmetry in the face 27 of the bottle, it probably will be so constricted inwardly that it will have only a limited utility as formed by merely cutting off the tip. It is usually satisfactory for merely pouring, but not for receiving a stopper or cork.

As shown in Fig. 3 it is preferred to ream or bore out the molded orifice throat, as by the rotary drill device 30 which is so formed as to ream out the undesired unsymmetrical or constricted portions defining portion 16 of the throat to form the properly shaped mouth 31 as indicated in Fig. 3. The drilling or reaming may so change the surface of the throat as to mark the interior of the neck so that it can be told visually from the molded or cast neck at the upper end, but this is not disadvantageous, especially as the sealing corks 32 preferably used for insertion in the ends have each a skirt 33, arranged to be flared over the lip or bead of the respective ends and to overlie the necks externally to conceal the throat portions.

It will be clear that uniform corkage of the receptacles can be secured despite the fact that one mouth is molded and the other is reamed to the proper angular disposition and diameter.

It is to be understood that either or both ends of the bottle may be provided with a threaded neck in place of or in combination at the other end, with a beaded or lipped terminal portion. The neck 34 having thread 35, in Fig. 5, represents such modification of either or both of necks 20 and 11 of the bottle of Fig. 1.

The utility and advantages of the invention will be evident.

Having thus described my invention, I claim:

1. The method of forming a double mouthed bottle from a molded bottle having a mouth at one end only while having at the other end an elongated hollow neck closed by a removable tip with the internal surface of the bottle continuing in an irregular passage into the tip through the neck, which comprises molding such bottle, cutting away the tip transversely of the neck to expose an irregular aperture leading into the bottle, then reaming out the aperture to form a regular aperture opening as a mouth in the end of the neck to receive a stopper.

2. The method of forming a double mouthed bottle from a molded bottle having a mouth at one end only while having at the other end an elongated neck terminating in a plane end from which a tip emerges of smaller transverse size than the plane end with the inner surface of the bottle extending through the neck and into the tip in a closed end of the bottle, which comprises molding such bottle, using the plane end of the bottle adjacent to the tip as a guide and cutting off said tip to form a completely planar end on the neck of such bottle of which the outer peripheral portion is molded and the inner peripheral portion is cut and forming an irregular aperture into the bottle neck, then reaming out and shaping the irregular aperture and forming a stopper-receiving mouth in the planar end of the neck.

FRANK H. WHEATON, Jr.